US008611376B2

(12) United States Patent
Ibrahim

(10) Patent No.: US 8,611,376 B2
(45) Date of Patent: Dec. 17, 2013

(54) RADIO DATA TRANSMISSION METHOD EMPLOYING SEVERAL DIFFERENT PILOT PATTERNS, CORRESPONDING BASE STATION, MOBILE, SYSTEM AND RECEPTION METHOD

(75) Inventor: Nicolas Ibrahim, Montigny le Bretonneux (FR)

(73) Assignee: Sierra Wireless, Issy-les-Moulineaux Cedex (FR)

( * ) Notice: Subject to any disclaimer, the term of this patent is extended or adjusted under 35 U.S.C. 154(b) by 1559 days.

(21) Appl. No.: 10/553,535

(22) PCT Filed: Apr. 16, 2004

(86) PCT No.: PCT/FR2004/000958
§ 371 (c)(1),
(2), (4) Date: Dec. 14, 2006

(87) PCT Pub. No.: WO2004/095791
PCT Pub. Date: Nov. 4, 2004

(65) Prior Publication Data
US 2008/0107135 A1    May 8, 2008

(30) Foreign Application Priority Data

Apr. 17, 2003 (FR) .................................... 03 04846

(51) Int. Cl.
*H04B 3/10* (2006.01)
(52) U.S. Cl.
USPC ........... 370/500; 370/329; 370/335; 455/434; 455/450; 455/455
(58) Field of Classification Search
USPC .......... 370/335, 329, 500; 455/434, 450, 455
See application file for complete search history.

(56) References Cited

U.S. PATENT DOCUMENTS

| 5,867,478 A | 2/1999 | Baum et al. ................... 370/203 |
|---|---|---|
| 6,415,163 B1 * | 7/2002 | Keskitalo et al. .......... 455/562.1 |
| 6,961,364 B1 * | 11/2005 | Laroia et al. .................. 375/132 |
| 2002/0122381 A1 | 9/2002 | Wu et al. ....................... 370/208 |
| 2004/0246998 A1 * | 12/2004 | Ma et al. ....................... 370/527 |
| 2005/0136934 A1 | 6/2005 | Alard ............................ 455/450 |
| 2010/0226334 A1 * | 9/2010 | Ma et al. ....................... 370/329 |

FOREIGN PATENT DOCUMENTS

| EP | 1148673 | * | 4/2001 |
|---|---|---|---|
| EP | 1 148 674 A2 | | 10/2001 |
| EP | 1148673 | * | 10/2001 |
| EP | 1170897 A1 | | 1/2002 |
| WO | WO 02/087139 A1 | | 10/2002 |

\* cited by examiner

*Primary Examiner* — Lester Kincaid
*Assistant Examiner* — Mehmood B Khan
(74) *Attorney, Agent, or Firm* — David D. Brush; Westman, Champlin & Koehler, P.A.

(57) ABSTRACT

A method and apparatus are provided for the transmission of radio data between at least two transmitters and one receiver, said method employing at least one multi-carrier data transmission signal. The aforementioned multi-carrier signal is formed by a temporal succession of symbols comprising: (i) informative data elements, and (ii) reference data elements known as pilots which are distributed within the informative data elements according to a pre-determined pattern. Moreover, the value of said pilots at transmission is known to the receiver. At least two transmitters use different pilot patterns such that, at a give instant and a give frequency, only one pilot can be received (possibly with other informative data elements) by the receiver from other transmitters.

9 Claims, 3 Drawing Sheets

RADIO DATA TRANSMISSION METHOD EMPLOYING SEVERAL DIFFERENT PILOT PATTERNS, CORRESPONDING BASE STATION, MOBILE, SYSTEM AND RECEPTION METHOD

CROSS-REFERENCE TO RELATED APPLICATION

This Application is a Section 371 National Stage Application of International Application No. PCT/FR2004/000958, filed Apr. 16, 2004 and published as WO 2004/095791 A1 on Nov. 4, 2004, not in English.

FIELD OF INVENTION

The domain of the invention is cellular radio communication. More precisely, the invention relates to the reduction of interference between pilots in a radio mobile system (preferably of the cellular type) using a multicarrier modulation with distributed pilots.

BACKGROUND OF THE INVENTION

The invention is more particularly but not exclusively applicable to radio communication systems like those described in French patent No. 2 777 407 submitted on Apr. 10, 1998 under the name of the same applicant as this patent application and entitled "cellular radiotelephony signal with additional channel assigned to the down direction, and corresponding method, system, mobile and base station".

Such systems comprise a two-directional symmetric main channel comprising a main up channel (from a mobile terminal to a base station) and a main down channel (from a base station to a mobile terminal) particularly for the transmission of signalling and control data and information at low or medium speed. They also comprise an additional channel assigned to the down direction, which carries high speed data transmission. This additional channel preferably uses a multicarrier modulation, for example of the OFDM (Orthogonal Frequency Division Multiplexing) type.

More generally, the invention is applicable to any radio communication system using data transmission by multicarrier modulation with distributed pilots, in which a receiver has information (direct or indirect) about the source of the multicarrier modulated data that it receives.

Its applications are particularly in the context of the 3.5G mobile radio communication system in which a down link called an HSDPA has high speed and mobility characteristics and can use an OFDM type multicarrier modulation.

Remember that a multicarrier modulation is a digital modulation, in other words it is a method of generating an electromagnetic signal from digital information to be transmitted. The innovation and the advantage of such a modulation is to breakdown the frequency band allocated to the signal into a plurality of sub-bands chosen to be less wide than the channel coherence band (in other words the band for which the frequency response of the channel may be considered to be correlated on a given duration) and on which the channel can therefore be assumed to be constant during the symbol transmission time. The digital information to be transmitted during this period is then distributed on each sub-band, so as to:

reduce the modulation speed (in other words increase the symbol duration) without modifying the transmitted speed;

simply model the action of the channel on each sub-band, using the complex multiplier model.

In reception, a simple received data correction system (consisting of making a complex division using the estimated channel) provides a means for satisfactory recovering information sent on each carrier, except for carriers on which deep fading has taken place. In this case, if no information protection measures are taken, data transported by these carriers will be lost. Therefore, a multicarrier system is only interesting if the generation of the electric signal is preceded by digital data processing, for example such as an error correction coding and/or interlacing.

Recovery of the information sent on each carrier in reception is conventionally preceded by a channel estimating step during which the transfer function of the transmission channel is estimated.

When the channel can be considered to be practically constant on each sub-carrier (multiplication channel), it can then be modelled by a complex estimation coefficient $H_{m,n}$ (where m is the index of the sub-carrier and n is the index of the OFDM symbol considered).

The invention is more particularly applicable to the case in which the channel estimate is made using pilots distributed within useful data elements to be transmitted, in the time-frequency space.

The channel estimate by distributed pilots consists of inserting reference carriers in the flow of useful carriers, at locations known to the receiver. In reception, the values taken on by these reference carriers called pilots are read, and the complex gain of the channel is easily deduced at these reference locations. The complex gain of the channel is then deduced on all points of the transmitted time-frequency network, from the calculated value of the complex gain at the reference locations.

All emitters in radiomobile systems using an OFDM modulation known at the present time share the same time/frequency resources: in other words, all emitters can emit data to at any known instant and can use the entire frequency band allocated to the system. Useful data elements are distributed in the time-frequency plane used, and the pilots are inserted between these data elements according to a predetermined distribution known in emission and in reception, called a pilot pattern.

All emitters in all these systems, for example such as HiperLAN, IEEE802.11, or DAB, use the same pilot pattern common to the entire system.

Therefore one disadvantage of these conventional systems is that interference between pilots emitted by distinct but geographically close emitters is inevitable. Since all emitters use the same pilot pattern, several pilots are emitted at the same time and at the same frequency by the different emitters in the system, such that any one receiver receives the pilot emitted by the emitter associated with it, and also one or several interfering pilots originating from one or several neighbouring emitters.

Therefore the channel estimate in reception and extraction of the corresponding useful information are strongly disturbed by the existence of this inter-pilot interference. Therefore the reception quality and performances of the receiver are strongly reduced.

At the moment, no known radio communication system has used a technique capable of cancelling or at least reducing this harmful interference phenomenon, due to the a priori very high complexity of such a technique.

SUMMARY OF THE INVENTION

One particular purpose of an embodiment of the invention is to overcome these disadvantages in prior art.

More precisely, one purpose of an embodiment of the invention is to provide a technique for transmission of radio data using a multicarrier modulation with distributed pilots in which interference between pilots is less than with techniques in prior art.

Another purpose of an embodiment of the invention is to use such a technique that consequently improves receiver performances, and particularly in which the estimating quality of the radio mobile transmission channel is better than with techniques according to prior art.

Another purpose of an embodiment of the invention is to provide such a technique that is simple and inexpensive to implement. In particular, the purpose of the invention is to implement such a technique that does not require the use of complex and expensive calculations in terms of resources, to reduce interference affecting the pilots.

One embodiment of the invention relates to a process for transmission of radio data between at least two emitters and a receiver, using at least one multicarrier data transmission signal. The multicarrier signal is formed from a sequence in time of symbols built firstly with information data elements, and secondly with reference elements called pilots, distributed within the said information data elements according to a predetermined pattern and for which the value during emission is known to the said receiver.

According to an embodiment of the invention, at least two of the said emitters use distinct pilot patterns, such that at any given moment and at any given frequency, the said receiver can only receive one pilot from the said emitters.

Thus, an embodiment of the invention is based on a totally novel and inventive approach to radio data transmission by multicarrier modulation with distributed pilots. The embodiment advantageously uses the fact that the receiver directly or indirectly knows the source of the data that it receives (for example in the case of a cellular radio communication network, the receiver has information about the base station that sent the data that it receives). Therefore, the embodiment proposes to attribute different pilot patterns to some emitters in the radio communication system considered, for example such that two nearby emitters do not emit two distinct pilots that could be received by the same receiver at the same time and at the same frequency. Thus, a network receiver can only receive a single pilot at a given instant and at a given frequency.

By assigning different pilot patterns to different emitters in a radio communication network, the inter-pilot interference is considerably reduced. Interference affecting pilots is limited to interference from information data elements emitted at the same time and at the same frequency by neighbouring emitters.

Therefore, the pilot extraction quality is very much better than with techniques according to prior art. The result is better estimating of the transmission channel transfer function and therefore better reception quality of useful data by the receiver.

The said multicarrier signal is preferably of the OFDM type.

In one preferred embodiment of the invention, the said transmission method uses at least three different pilot patterns.

Thus, these three pilot patterns are distributed between the different emitters in the network, such that three emitters close to each other use three different pilot patterns. Two network emitters sufficiently far from each other and therefore that do not interfere with each other can use the same pilot pattern.

Advantageously, each of the said emitters uses its own pilot pattern.

This minimises the risk of interference between pilots.

Preferably, the said method comprises a step for generation of the said pilot patterns using a generation function for which one parameter is an identifier of the said associated emitter.

Therefore, it is particularly easy for a receiver to determine the pilot pattern used by a particular emitter from which it receives data, using the identifier of this emitter.

According to one advantageous embodiment of the invention, the said process uses a step in which, for at least one of the said emitters, elements with practically zero energy are inserted in the said data elements of the said multicarrier signal, at locations in the time-frequency space corresponding to the locations of the pilots of the said multicarrier signal emitted by at least another of the said emitters.

Therefore, this further reduces the degree of interference affecting the pilots.

Preferably, the said pilots are emitted with a higher energy level than the said information data elements.

In this way, the energy level of interference affecting the pilots that, according to the invention, is due only to information data elements, is lower than the energy level of the pilots themselves.

In one preferred embodiment of the invention, such a method is used in a cellular radio communication network, the said emitters are the base stations of the said network, and the said receiver is a mobile terminal.

Advantageously, the transmission method also transmits at least one control information transmission signal, so that the receiver can notably identify the emitter that emitted the data when it receives them.

An embodiment of the invention also uses the fact that the receiver directly or indirectly knows the source of the data that it receives by reference to a control information transmission signal.

An embodiment of the invention also relates to a method of receiving data transmitted according to the previously described transmission method, comprising a step to determine the pilot pattern used by the emitter of the said data.

According to a first operating mode, the reception method includes:
  a first step for reception of data emitted by the said multicarrier data transmission signal;
  a second step to identify the emitter that emitted the said data, using the control information transmission signal;
  a third step to identify the said pilot pattern used by the said identified emitter.

Advantageously, the said pilot pattern is generated using a generation function for which one parameter is an identifier of the said associated emitter, and the said determination step uses the said generation function as a function of the said identified emitter.

Therefore the receiver uses the generation function with the identifier of the emitter determined from the control information transmission signal as a parameter, to determine what pilot pattern is used in the multicarrier signal that it receives.

According to a second operating method, the reception process comprises:
  a first step to receive data transmitted by the said multicarrier data transmission signal;
  a second step to determine the said pattern of pilots used by the said emitter;
  a third step to identify the emitter that sent the said data, using the said determined pilot pattern.

Advantageously, the said determination step analyses a correlation between the said multicarrier data transmission signal and at least one pattern in a list of predetermined patterns.

Preferably, this process also uses a step to extract the said pilots from the said multicarrier data transmission signal, and a step to estimate the transfer function of a transmission channel associated with the said multicarrier signal.

A further embodiment of the invention relates to a cellular radio communication system comprising at least two emitters and one receiver, using at least one multicarrier data transmission signal. The multicarrier signal is formed from a time sequence of symbols composed firstly of information data elements and secondly of reference elements called pilots distributed within the said information data elements according to a predetermined pattern (in other words, the symbols are composed of information data elements and pilots) and for which the value on emission is known to the said receiver.

According to an embodiment of the invention, at least two of the said emitters comprise means of generating distinct pilot patterns, such that only one pilot can be received by the said receiver from the said emitters, at a given time and at a given frequency.

A further embodiment of the invention relates to a base station of a cellular radio communication system comprising means of emitting data transmitted according to the previously described transmission method, comprising means of generating a pilot pattern using the generation function using an identifier of the said base station as a parameter, such that two base stations with distinct identifiers generate two equally distinct pilot patterns.

Another embodiment of the invention relates to a cellular radio communication system comprising means of receiving data transmitted according to the previously described transmission method, comprising:
- means of receiving data transmitted by the said multicarrier data transmission signal;
- means of identifying the emitter that emitted the said data;
- means of determining the said pilot pattern used by the said emitter.

Other characteristics and advantages of one or more embodiments of the invention will become clear after reading the following description of a preferred embodiment given as a simple illustrative and non-limitative example, and the attached drawings.

DETAILED DESCRIPTION OF ILLUSTRATIVE EMBODIMENTS

The general principle of an embodiment of the invention is based on the proprietary assignment of pilot patterns to different emitters in a radio communication system using a multicarrier modulation with distributed pilots.

Figure 1:
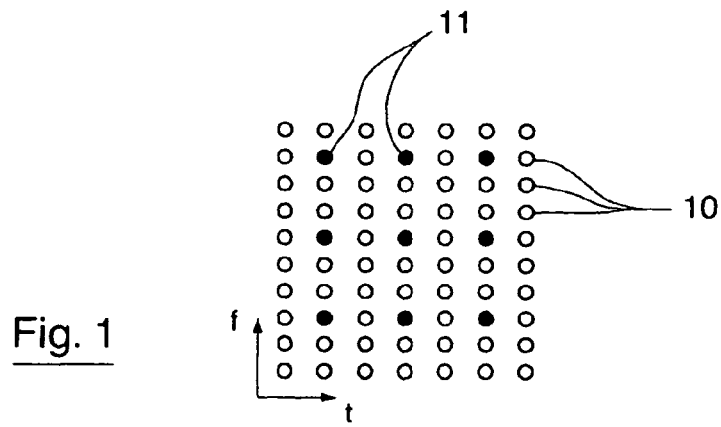
FIG. 1 shows an example of a single pattern of pilots used according to techniques in prior art by all emitters in a radio communication system using a multicarrier modulation.

We will describe an example of a single pattern of pilots used by all emitters in a radio communication system according to prior art, with reference to FIG. 1.

In FIG. 1, each point in the time-frequency space corresponds to the emission of a multicarrier signal carrier, for example of the OFDM (Orthogonal Frequency Division Multiplexing) type. The white dots 10 correspond to emission of a carrier modulated by an information or useful data element, at a given time and at a given frequency. The black dots 11 correspond to emission of pilots distributed within the useful data. In the example shown in FIG. 1, two consecutive pilots 11 are separated by one useful carrier 10 in time, and by two useful carriers 10 in frequency.

According to techniques in prior art (HiperLAN, DVB-T, DAB, etc.), all emitters in a single radio communication network use the pilot pattern like that shown in FIG. 1. Therefore, at a given time and a given frequency, all emitters in the system simultaneously emit a pilot or a useful carrier, and this generates strong interference phenomena between pilots on reception.

Figure 2:
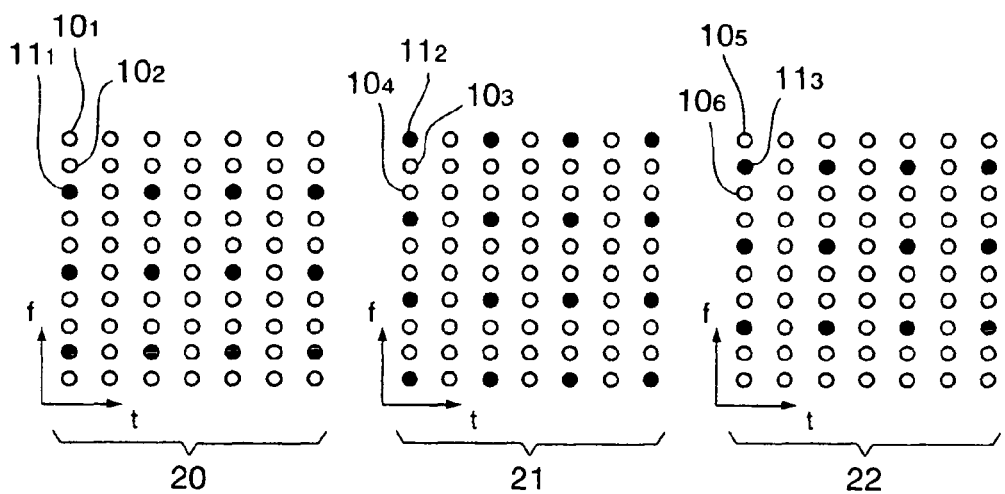
FIG. 2 illustrates the alternative to the technique in FIG. 1 proposed by the invention, according to which distinct emitters in the radio communication system use several distinct pilot patterns.

However according to an embodiment of the invention and as shown in FIG. 2, it is planned to assign distinct pilot patterns to different emitters in the radio communication network considered. For example, a different pilot pattern could be assigned to each emitter in the network, such that a given pilot pattern is associated with a single emitter, or base station, in the network.

However, the inventors of this patent application have observed that two emitters that are not geographically close to each other do not interfere with each other very much, such that two base stations sufficiently remote from each other can use the same pilot pattern without there being any problem of interference between pilots.

In particular, the inventors of this application have observed that in some cases (but not always) it is sufficient to use three distinct pilot patterns assigned selectively to each emitter in the network to significantly reduce interference between pilots and therefore to increase the quality of reception performances.

This is the example shown in FIG. 2, in which three patterns 20, 21 and 22 of pilots used within the same cellular radio communication network are shown. As for FIG. 1, the white dots 10 show the useful carriers and the black dots 11 show the pilots.

For example, the pilot patterns 20, 21 and 22 are used by three neighbouring emitters in the same communication network. In each of these three patterns, and as for the single pattern described previously with reference to FIG. 1, two consecutive pilots 11 are separated by one useful carrier 10 in time, and by two useful carriers 10 in frequency.

However, the pilot pattern reference 21 (respectively 22) is offset by one carrier in frequency from the pilot pattern reference 22 (respectively 20).

Thus, when a first emitter using the pattern reference 20 emits a useful carrier $10_1$, a second emitter using a pattern reference 21 emits a pilot reference $11_2$, and a third emitter using the pattern reference 22 emits a useful carrier $10_5$. Similarly, when the first emitter emits a useful carrier $10_2$, the second emitter emits a useful carrier $10_3$ and the third emitter emits a pilot $11_3$. Finally, when a first emitter emits a pilot $11_1$, the second emitter emits a useful carrier $10_4$ and the third emitter emits a useful carrier $10_6$.

Thus, at a given time and at a given frequency, a receiver close to these three emitters only receives a pilot emitted by one of these base stations. Therefore, the interference affecting a pilot received by this receiver is due only to the useful carriers emitted at the same time and at the same frequency by neighbouring emitters. Since the emitted energy level of the pilots is higher than the energy of the useful data, this interference is solely due to data elements modulated with a lower energy level and is therefore very much less than with techniques according to prior art. Therefore receiver performances, particularly in terms of channel estimation and extraction of useful data, are strongly increased.

Figure 3:
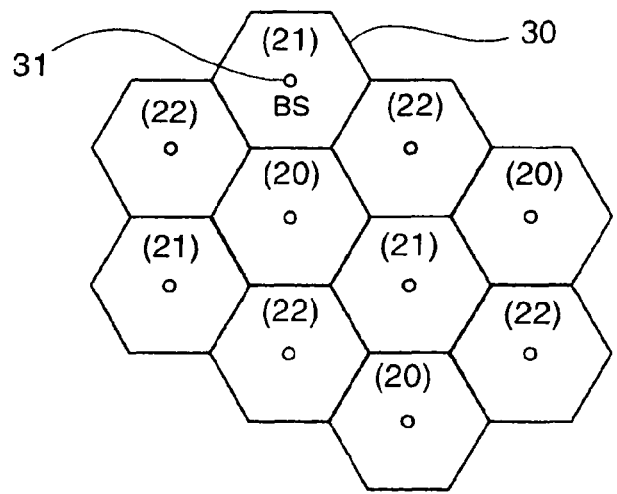
FIG. 3 shows an example of a cellular radio communication network to which this invention can be applied.

FIG. 3 shows an example distribution of pilot patterns references 20 to 22 in FIG. 2 in the context of a conventional cellular radio communication network to which an embodiment of the invention is applicable.

Remember that cellular telecommunication networks are composed of a mesh of their coverage area in smaller geographic areas called cells.

Each cell 30 corresponds to the geographic area covered by a base station 31 that emits and/or receives signals to and/or from the radio communication terminals present in the cell.

Obviously, one or more embodiments of the invention are equally applicable to any other type of radio communication network comprising a plurality of sources emitting signals.

Figure 4:
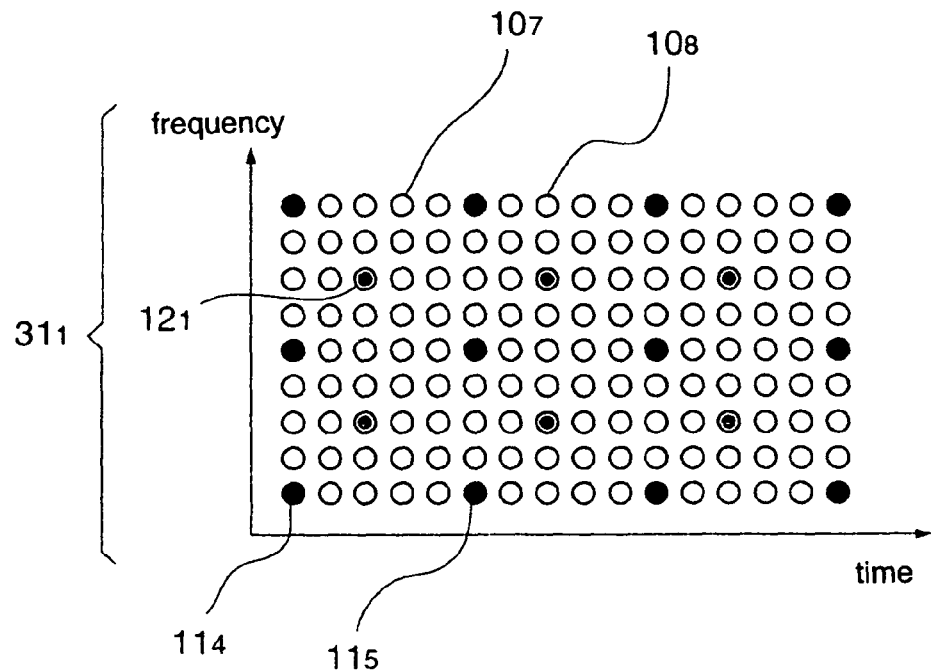
FIG. 4 shows a variant embodiment of the invention according to which the technique in FIG. 2 is chosen, but it is also chosen to emit symbols with zero energy at positions in the time-frequency space corresponding to the emission of pilots by at least one neighbouring emitter.
Figure 4:
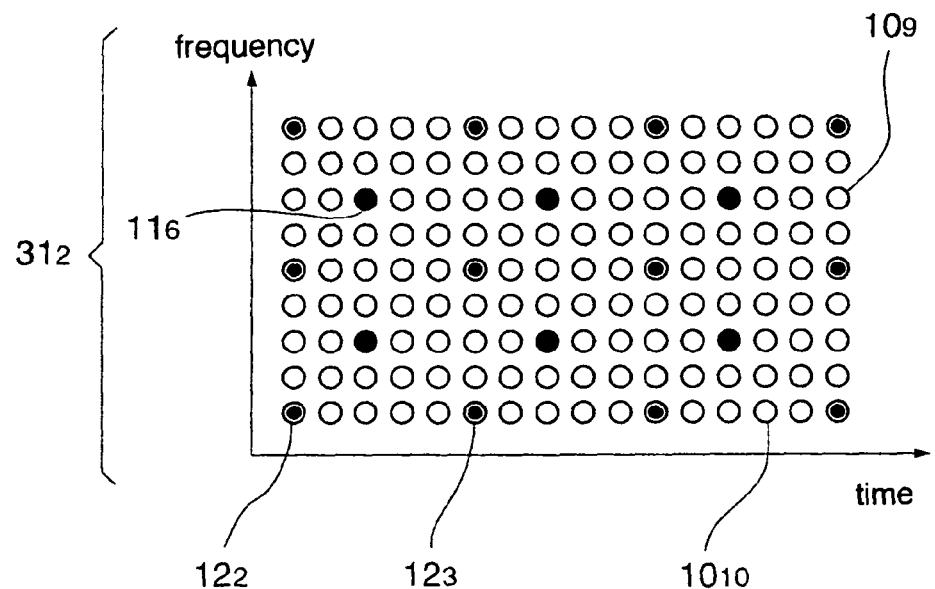

FIG. 4 indicates the reference of the pilot pattern in FIG. 2 used according to the invention by the emitter 31, for each cell 30. Note that two adjacent cells in the network always use two distinct pilot patterns, so as to reduce the interference phenomenon between pilots, which reduces the quality of reception by a mobile terminal located in one of the cells 30.

Obviously, it will be possible to consider using more distinct pilot patterns within the network (for example 7), so as to further reduce the interference phenomenon affecting the pilots.

The reduction of interference between pilots can be further improved using the variant embodiment of the invention shown in FIG. 4.

According to this variant, a first emitter 31 emits a data element with approximately zero energy when a neighbouring emitter 31 emits a pilot at the same time and at the same frequency. In this manner, a pilot received at a given time and at a given frequency by a receiver in the radio communication network is almost unaffected by interference due to signals emitted by neighbouring emitters.

For simplification reasons, this variant embodiment is described with reference to FIG. 4 in the special case in which only two interfering cells in a radio communication network are considered. Obviously, this principle can easily be extended to include a plurality of interfering neighbouring cells.

Therefore, we will consider two neighbouring emitters references $31_1$ and $31_2$ each emitting a signal for which the distribution in the time-frequency space is shown by the corresponding time-frequency network in FIG. 4.

Obviously, one or more embodiments of the invention are equally applicable to any other type of radio communication network containing a plurality of sources emitting signals.

The first signal is emitted in a first cell $30_1$ in the radio communication network according to the invention. Its structure is similar to that described above with reference to FIG. 1. In other words, it is formed from a time sequence of symbols, composed of a set of data elements each modulating a carrier frequency of the signal. These data elements comprise firstly the pilots $11_4$, $11_5$, and secondly information data elements $10_7$, $10_8$.

Furthermore, the first signal associated with the emitter $31_1$ comprises a plurality of data elements with zero energy, for example the element reference $12_1$.

Preferably, the patterns made by zero energy elements and pilots are regular. Thus, in the particular example in FIG. 4, two consecutive pilots are separated by four information elements in time and by three information elements in frequency. The same applies for two consecutive zero energy elements.

A second signal is emitted by a second emitter $31_2$ in the neighbouring cell $30_2$ in the network according to the invention. This second signal is structurally identical to the first signal, namely it is formed from information data elements $10_9$, $10_{10}$, within which firstly zero energy elements $12_2$, $12_3$ and secondly pilots $11_6$ are inserted.

According to an embodiment of the invention, it is arranged such that the location of a zero energy element $12_1$ of the first signal in the time—frequency space coincides with the position of the pilot $11_6$ of the second signal in time and frequency. Similarly, the position in time and frequency of zero energy elements $12_2$, $12_3$ of the second signal is chosen to be identical to the position of the corresponding pilots $11_4$, $11_5$ in the first signal.

Therefore, the pilot $11_6$ received by a receiver located in the cell $30_1$ is not subject to any interference from the signals emitted by emitters in adjacent cells, and particularly cell $30_2$, since the emitter $31_2$ emits a symbol with practically zero energy at the same time and at the same frequency.

Figure 5:
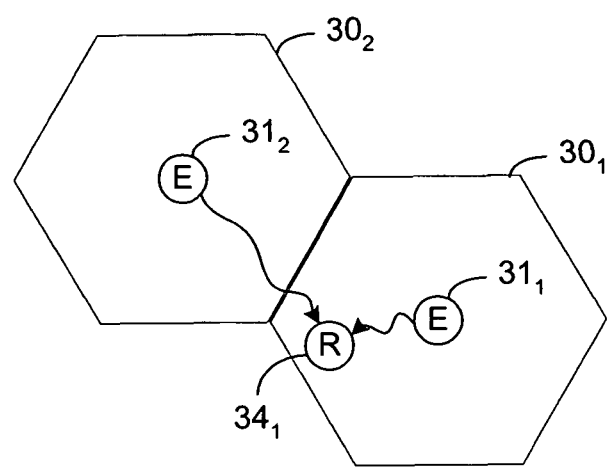
FIG. 5 shows an example of a cellular radio communication network to which one or more embodiments of the present invention can be applied.

Therefore, the channel estimate and processing of useful information by this receiver are improved.

embodiment of the invention also relates to reception of data transmitted using the transmission method described above, as illustrated in FIG. 5 for example.

According to the embodiment, a receiver $34_1$ receives only one pilot emitted by one of the emitters $31_1$ and $31_2$, at a given time and at a given frequency. Therefore the interference affecting a pilot received by this receiver is due solely to useful carriers emitted at the same time and at the same frequency by neighbouring emitters.

In terms of reception, in a first operating mode, the receiver $34_1$ detects the multicarrier data transmission signal and the control information emission signal. It then implements several steps:
- a first step for receiving data transmitted by the multicarrier data transmission signal;
- a second step for identifying the emitter that emitted the data, using a control information transmission signal;
- a third step for determining the pilot pattern used by the identified emitter.

In a second operating mode, the receiver $34_1$ detects the multicarrier data transmission signal, but does not detect the control information transmission signal. It then implements several steps:
- a first step for receiving data transmitted by the multicarrier data transmission signal;
- a second step for determining the pilot pattern used by the emitter;
- a third step for identifying the emitter that emitted the data, using the said determined pilot pattern.

According to this second operating mode, a receiver $34_1$ located in a first cell $30_1$ in the radio communication network according to the invention is considered, receiving signals emitted by a first emitter $31_1$ in the first cell $30_1$ and at the same time by a second emitter $31_2$ in a second nearby cell $30_2$, the receiver $34_1$ knowing the different possible symbol patterns emitted by different emitters.

Obviously, the invention is equally applicable to any other type of radio communication network containing a plurality of sources emitting signals.

According to this second operating mode, the receiver $34_1$ can detect the presence of the second emitter $31_2$ and demodulate information sent by this second emitter in a multicarrier data transmission signal, even if it does not receive any additional information about the pilot pattern used by this second emitter, in other words blind or without knowledge of control information.

A receiver can only receive one pilot symbol from different emitters at a given time and at a given frequency. Since the pilot symbols do not overlap, the receiver can detect the position of pilot symbols in the multicarrier signal blindly.

Observations made at the receiver on the pilot symbols of a received multicarrier signal do not change at random, while observations made on information symbols do change at random.

Considering that the observations made on pilot symbols do not change at random, the receiver can compare the distribution of symbols (pilot symbols and information symbols) with different possible symbols of different emitters known to the receiver.

The receiver then tests the variation of observations made on the different symbols of the received multicarrier signal and the correlation between these symbols and the different patterns known to the receiver, and can thus detect the position of the pilot symbols in the multicarrier signal blindly.

Thus, the symbols pattern with the best correlation (or with the least variation) from the multicarrier signal corresponds to the pattern of pilot symbols used by the first emitter.

Starting from the pattern of pilot symbols used, the receiver can thus determine the position of pilots in the time/frequency space and then estimate the transmission channel and equalise symbols in the multicarrier signal.

We will now briefly describe a preferred method of generating different pilot patterns used within a radio communication system according to the invention.

A pilot pattern is generated using a generation function that uses an identifier of the emitter that will use it as a parameter.

When this function is bijective, the uniqueness of the pilot pattern is guaranteed within the network, so that the receiver can simply and immediately find the pattern associated with the signal that it receives, using the identifier of the emitter transported by the control information transmission signal.

If we consider a radio communication network in which four distinct pilot patterns are distributed between the emitters, and if n represents the number of an emitter (for example a base station), the generation function $f$ of the pilot patterns may for example determine the beginning of the pilot pattern in frequency.

Thus, the index of the first pilot pattern in frequency may be given by $f(n)=2+n \% 4$, if the spacing between two consecutive pilots in frequency is greater than 4.

In reception, the receiver simply determines the identifier of the emitter of the received signal, using the control information transmission signal. It can then use the generation function that it memorised and deduce the pilot pattern used in the multicarrier signal that it receives, and extract pilots at the appropriate locations in the time-frequency network. These pilots are then used to make an estimate of the transmission channel transfer function.

Therefore, the technique according to an embodiment of the invention enables an efficient reduction of interference affecting the pilots without the need for an additional calculation on information data elements and pilots.

Note that the network operator can define the distribution of pilot patterns at the time of the initial deployment, before the radio communication network is put into service.

The invention claimed is:

1. Method for reception of radio data transmitted between at least two base stations and one mobile terminal wherein the method comprises, in said mobile terminal, the following successive steps:
    a first step of receiving data transmitted by a multicarrier data transmission signal, the multicarrier data transmission signal being formed from a sequence in time of symbols comprising firstly information data elements, and secondly reference elements called pilots,
        said pilots being distributed within the information data elements according to a predetermined pattern, and having a value at emission known by the mobile terminal,
        wherein, the pilot pattern was generated using a generation function for which one parameter is an identifier of one of said at least two base stations,
        at least two of the base stations using distinct pilot patterns such that at any given moment and at any given frequency, the mobile terminal can only receive one pilot from the at least two base stations;
    a second step of identifying the base station, which emitted the data, from a received control information transmission signal comprising the identifier of the base station that emitted the data; and
    a third step of determining the pilot pattern used by the identified base station, after identification in the second step, by implementing the generation function using the identifier of the identified base station that was transported by the control information transmission signal to find the pilot pattern associated to said identifier.

2. Method for reception of data according to claim 1 and further comprising a step of extracting the pilots from the multicarrier data transmission signal, and a step of estimating a transfer function of a transmission channel associated with the multicarrier data transmission signal.

3. Method for reception of data according to claim 1, wherein the multicarrier data transmission signal is of an OFDM type.

4. Method for reception of data according to claim 1, wherein each of the base stations uses a specific pilot pattern.

5. Method for reception of data according to claim 1, wherein said method is implemented in a cellular radio communication network, and the base stations are base stations of the network.

6. A cellular radio communication system comprising:
    at least two base stations and one mobile terminal, implementing a multicarrier data transmission signal, the multicarrier data transmission signal being formed from a time sequence of symbols composed firstly of information data elements and secondly of reference elements called pilots,
        said pilots being distributed within the information data elements according to a predetermined pattern, and having a value at emission known by the mobile terminal;
    wherein the pilot pattern was generated using a generation function for which one parameter is an identifier of one of the at least two base stations,
    wherein at least two of the base stations use distinct pilot patterns, such that only one pilot can be received by the mobile terminal from the at least two base stations, at a given time and at a given frequency; and wherein said mobile terminal comprises:

first means for receiving data transmitted by the multicarrier data transmission signal;

second means for identifying the base station that emitted the data, from a a received control information transmission signal comprising the identifier of the base station that emitted the data; and third means for determining the pilot pattern used by the identified base station, after identification by the second means, by implementing the generation function using the identifier of the identified base station that was transported by the control information transmission signal to find the pilot pattern associated to said identifier.

7. A cellular radio communication system comprising:

a mobile terminal adapted to receive radio data transmitted by at least two base stations, in the form of a multicarrier data transmission signal, the multicarrier data transmission signal being formed from a time sequence of symbols composed firstly of information data elements and secondly of reference elements called pilots, said pilots being distributed within the information data elements according to a predetermined pattern, and having a value at emission known by the mobile terminal, wherein the pilot pattern was generated using a generation function for which one parameter is an identifier of one of said at least two base stations, at least two of the base stations using distinct pilot patterns, such that only one pilot can be received by the mobile terminal from the at least two base stations, at a given time and at a given frequency, wherein the mobile terminal is configured to identify the base station that emitted the data, from a received control information transmission signal comprising the identifier of the base station that emitted the data, and to determine the pilot pattern used by the identified base station, after identification, by implementing the generation function using the identifier of the identified base station that was transported by the control information transmission signal to find the pilot pattern associated to said identifier.

8. Method for reception of radio data transmitted between at least two base stations and one mobile terminal wherein the method comprises, in said mobile terminal, the following successive steps:

a first step of receiving data transmitted by a multicarrier data transmission signal, the multicarrier data transmission signal being formed from a sequence in time of symbols comprising firstly information data elements, and secondly reference elements called pilots, said pilots being distributed within the information data elements according to a predetermined pattern, and having a value at emission known by the mobile terminal, wherein, the pilot pattern was generated using a generation function for which one parameter is an identifier of one of said at least two base stations, said generation function being given by $f(n)=2+n \mod s$, when considering a radio communication network in which four distinct pilot patterns are distributed between said at least two base stations, where n represents the number of one of said at least two base stations and the spacing between two consecutive pilots in frequency is greater than a number s, at least two of the base stations using distinct pilot patterns such that at any given moment and at any given frequency, the mobile terminal can only receive one pilot from the at least two base stations;

a second step of identifying the base station, which emitted the data, from a received control information transmission signal comprising the identifier of the base station that emitted the data; and a third step of determining the pilot pattern used by the identified base station, after identification in the second step, by implementing the generation function using the identifier of the identified base station that was transported by the control information transmission signal to find the pilot pattern associated to said identifier.

9. The method of claim 8, wherein said generation function is given by $f(n)=2+n \mod 4$, wherein the radio communication network comprises four distinct pilot patterns distributed between said at least two base stations and the spacing between two consecutive pilots in frequency is greater than 4.

* * * * *

UNITED STATES PATENT AND TRADEMARK OFFICE
CERTIFICATE OF CORRECTION

| | | |
|---|---|---|
| PATENT NO. | : 8,611,376 B2 | Page 1 of 1 |
| APPLICATION NO. | : 10/553535 | |
| DATED | : December 17, 2013 | |
| INVENTOR(S) | : Nicolas Ibrahim | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2107 days.

Signed and Sealed this

Twenty-second Day of September, 2015

Michelle K. Lee
*Director of the United States Patent and Trademark Office*